(12) United States Patent
Richard

(10) Patent No.: US 6,432,153 B1
(45) Date of Patent: Aug. 13, 2002

(54) PLATE VENTURI FOR A DUST COLLECTOR FILTER CLEANING SYSTEM

(76) Inventor: Kenneth L. Richard, P.O. Box 538, Uwchland, PA (US) 19480

(*) Notice: Subject to any disclaimer, the term of this patent is extended or adjusted under 35 U.S.C. 154(b) by 0 days.

(21) Appl. No.: 09/774,698

(22) Filed: Feb. 1, 2001

(51) Int. Cl.$^7$ .............................................. B01D 46/04
(52) U.S. Cl. ......................... 55/302; 55/341.1; 95/280
(58) Field of Search ......................... 55/293, 302, 303, 55/341.1; 96/428; 95/280; 239/569, 589, DIG. 21

(56) References Cited

U.S. PATENT DOCUMENTS

| | | | |
|---|---|---|---|
| 4,298,360 A | * 11/1981 | Poll | 55/302 |
| 4,610,704 A | * 9/1986 | Richard | 55/302 |
| 4,652,285 A | * 3/1987 | Greene | 55/302 |
| 4,746,339 A | * 5/1988 | Millard | 55/302 |
| 6,129,852 A | * 10/2000 | Elliott et al. | 55/302 |

* cited by examiner

*Primary Examiner*—Duane Smith
*Assistant Examiner*—Jason M. Greene
(74) *Attorney, Agent, or Firm*—Brady, O'Boyle & Gates

(57) ABSTRACT

A plate venturi for a dust collector filter cleaning system having a compressed air pipe for delivering pulsed compressed air jets through the venturi against a filter to remove particulates therefrom. The venturi is provided by a pair of spaced metal plates welded to each side of the compressed air pipe and extending tangentially therefrom. The plates diverge outwardly relative to each other to provide a throat portion therebetween. An elongated opening is provided in each plate in proximity to the compressed air pipe and the space between the plates provides openings at each end of the venturi so that upon pulse firing a jet of compressed air through the venturi, large quantities of air are induced through the openings in the plates of the venturi and through the open ends thereof, increasing the air mass and velocity, to thereby increase the impact effectiveness on cleaning the filter.

6 Claims, 4 Drawing Sheets

PLATE VENTURI FOR A DUST COLLECTOR FILTER CLEANING SYSTEM

BACKGROUND OF THE INVENTION

In my U.S. Pat. No. 4,610,704 dated Sep. 9, 1986, there is disclosed a dust collector filter cleaning system including a plurality of venturis mounted in a clean air duct and adapted for pulse firing a jet of compressed air upwardly into the filters to remove particulates therefrom.

The use of conventional venturis of the type shown in the aforementioned patent required that the jet hole be spaced far below the venturi entrance in order to obtain a large quantity of induced air. The required space between the jet hole and venturi entrance resulted in an increase in the height of the collector. In order to reduce the height of the collector while increasing the air mass and thus the effectiveness on cleaning the filters, the venturi of the present invention has been devised.

SUMMARY OF THE INVENTION

The venturi of the present invention comprises, essentially, a pair of spaced, vertically extending rectangular plates having divergent opposite end portions integral with a parallel medial portion forming a throat. The lower end portion of the venturi is welded to each side of a compressed air supply pipe and to the interior surface of a clean air duct in which the compressed air pipe is positioned. The throat portion communicates with a plurality of compressed air outlet apertures in the top wall portion of the compressed air supply pipe. At least one axially extending elongated opening is provided in the lower end portion of the face of each plate in proximity to the compressed air outlet apertures, to thereby provide induced air inlets on each side of the venturi together with induced air inlets on each end of the venturi provided by the spaced plates.

By this construction and arrangement, compressed air flowing through the compressed air outlets draws air both laterally through the openings in the plates and longitudinally through the opening at each end of the spaced plates, whereby the induced air mass is increased, thereby increasing the effectiveness of cleaning the filters.

DESCRIPTION OF THE PREFERRED EMBODIMENTS

Figure 1:
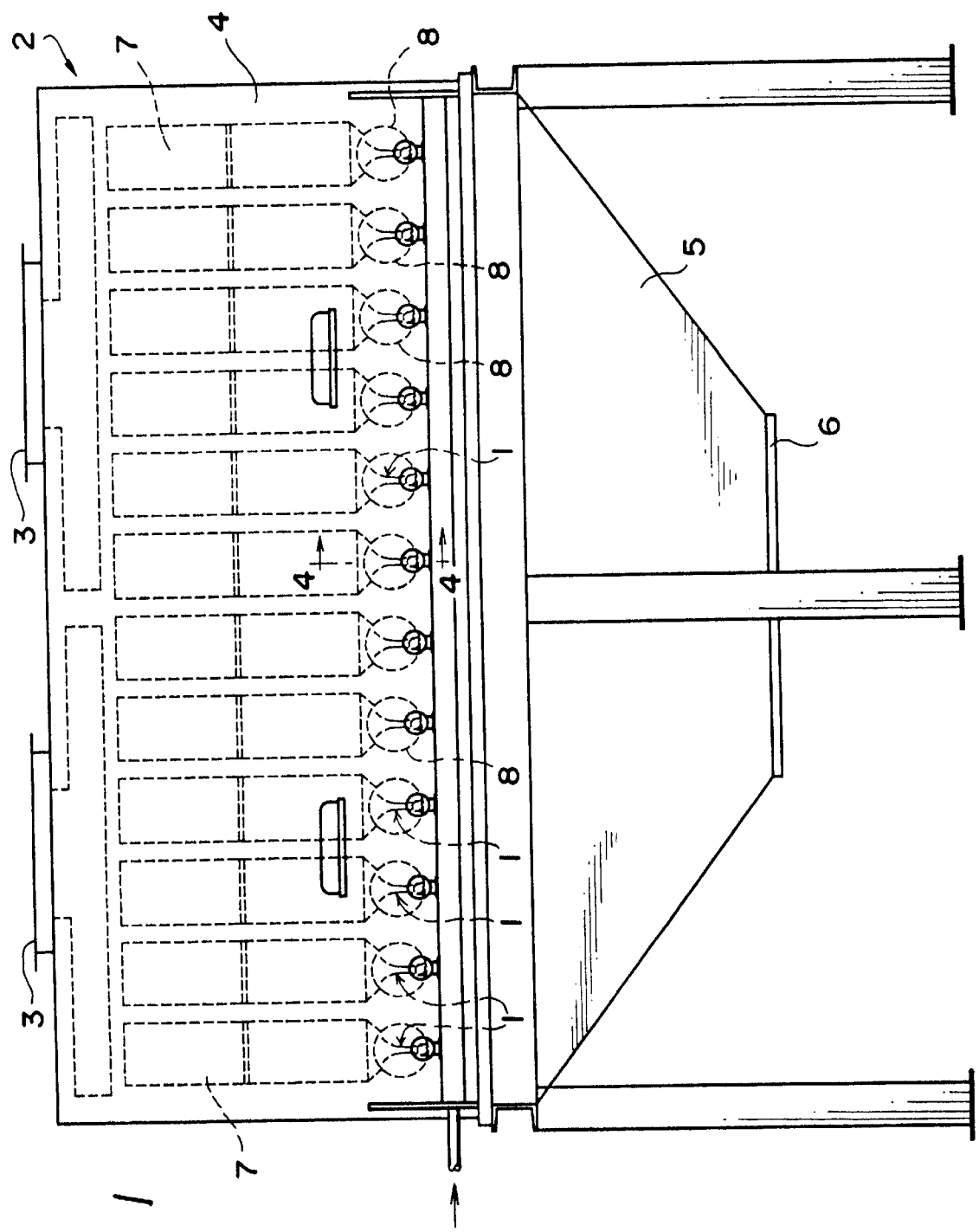
FIG. 1 is a side elevational view of a dust collector filter employing a plurality of the welded metal plate venturis of the present invention.
Figure 2:
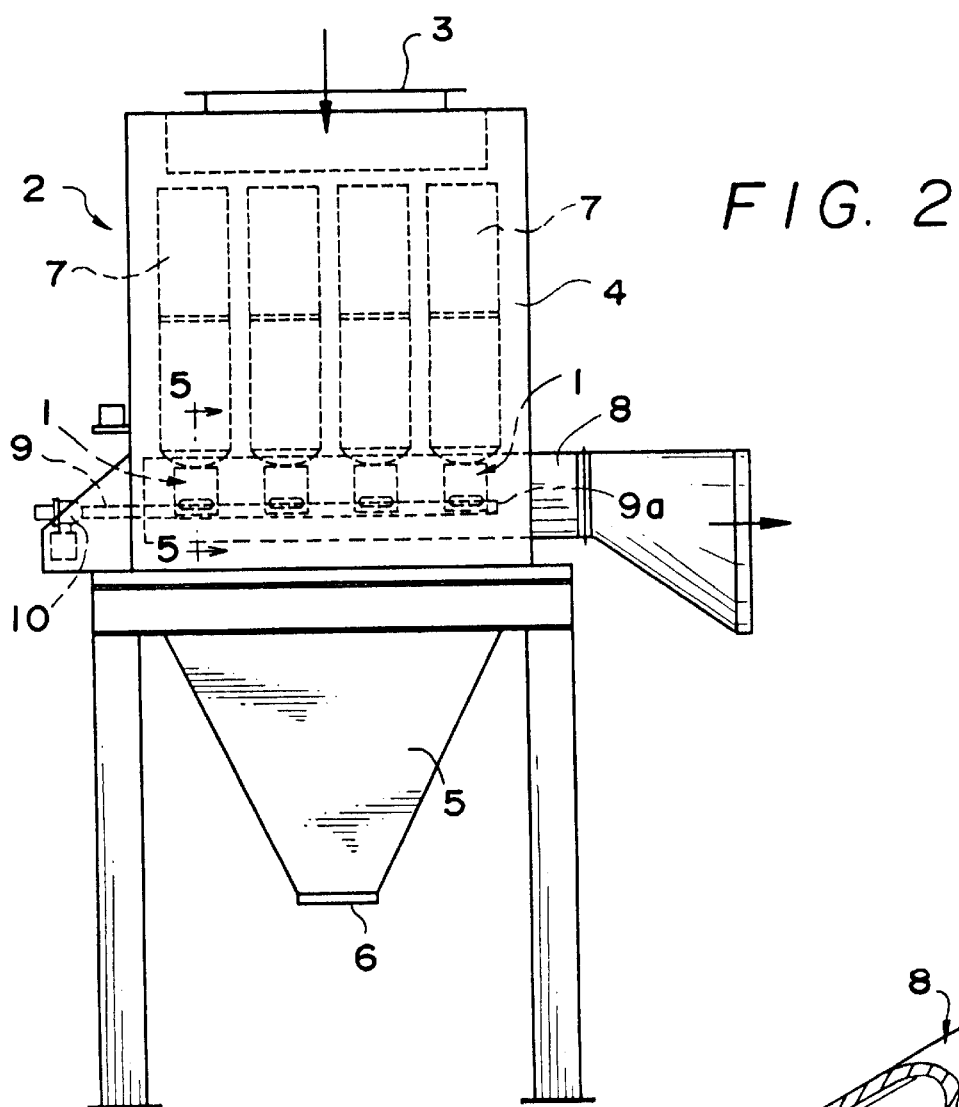
FIG. 2 is an end elevational view of the dust collector shown in FIG. 1.

Referring to the drawings and more particularly to FIGS. 1 and 2, the welded metal plate venturis of the present invention are adapted to be installed in an industrial dust collector 2 of the type disclosed in my U.S. Pat. No. 4,610,704 dated Sep. 9, 1986, the disclosure of which is incorporated herein by reference. The dust collector 2 includes a housing having an inlet opening 3 at the top thereof for the admission of particulate-laden gases. An intermediate section 4 of the housing provides a dirty gas chamber and the hopper, or lower portion, 5 of the housing tapers downwardly to a clean-out or dust discharge opening 6. The intermediate section 4 of the housing encloses a plurality of rows of individual filter elements 7, which are rigid cartridge type filters open at their upper ends and open at their bottom ends. A plurality of clean air ducts 8 are positioned below the filter elements and communicate with the lower open ends thereof.

From the structure thus far described, it will be apparent that the particulate-laden gases, flowing downwardly through the inlet 3, surround the filter elements 7 and flow radially inwardly through each filter, leaving some dust particles entrained on the outer surface of each filter 7, while some other particles will continue onto the lower portion 5 of the housing. The cleaned gases exit from the center portion of the filter elements 7 into the clean air ducts 8, through which they are conducted from the housing to the atmosphere via a fan system.

In order to periodically remove the accumulated dust particles on the outer surface of each filter 7, a reverse flow cleaning of the individual filters 7 is provided. To this end, a pipe 9, having one end connected to a periodically actuated diaphragm valve 10, communicating with a source of high pressure compressed air, now shown, extends axially within the clean air duct 8 and has the opposite end closed as at 9a.

Figure 3:
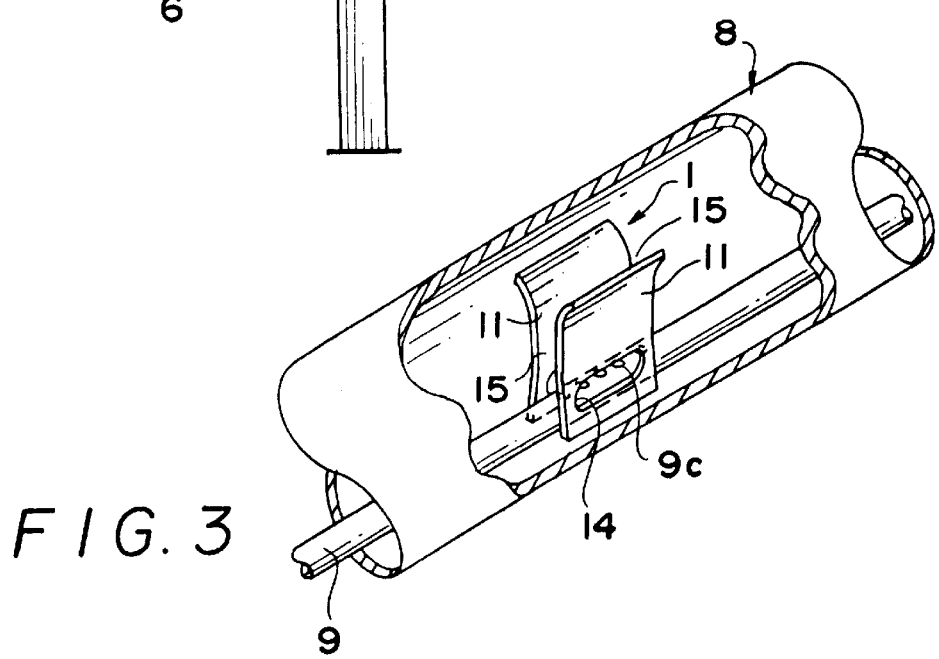
FIG. 3 is a fragmentary perspective view showing the venturi mounted in the clean air duct of the dust collector shown in FIG. 2.
Figure 4:
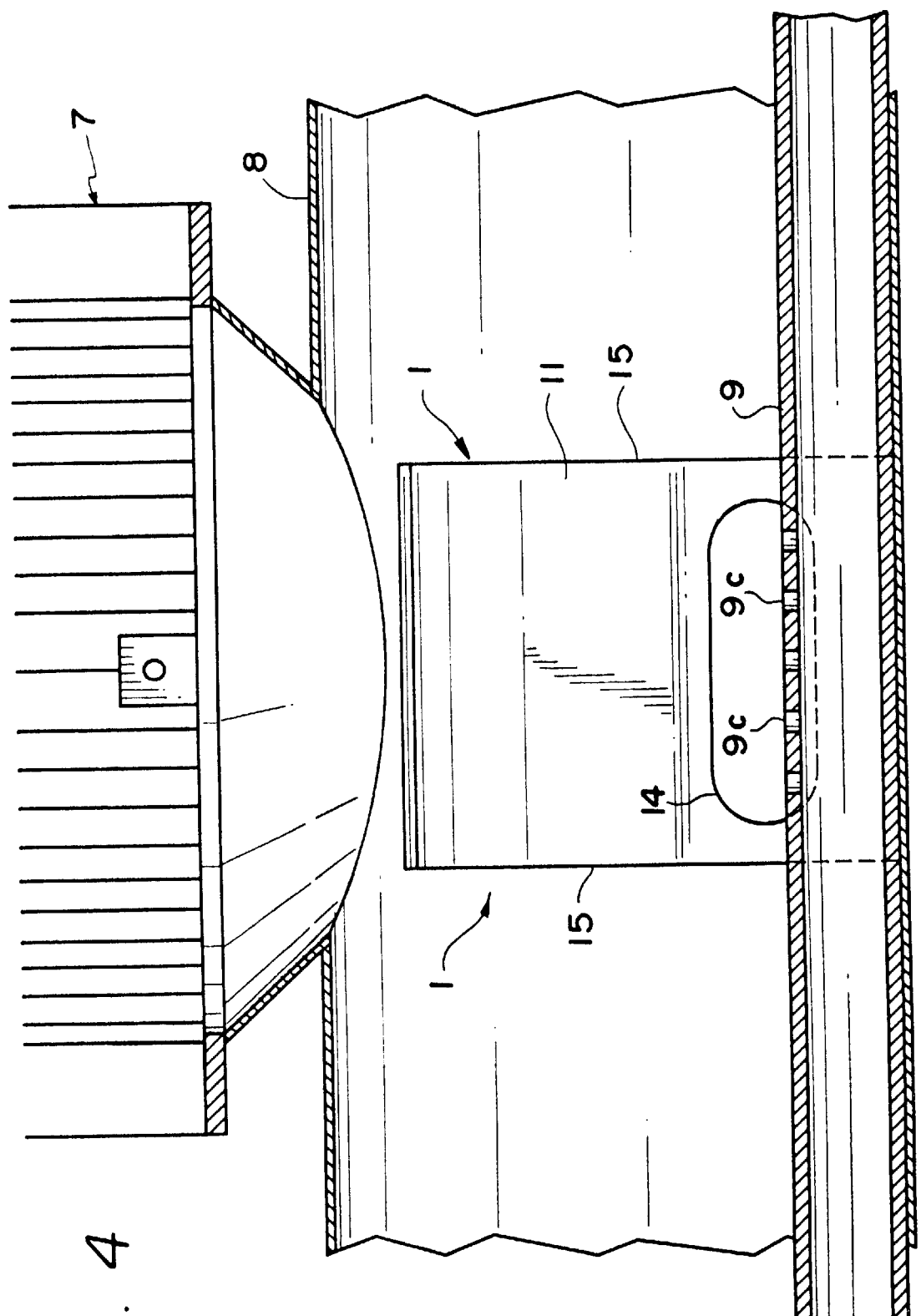
FIG. 4 is an enlarged view taken along line 4—4 of FIG. 1.
Figure 5:
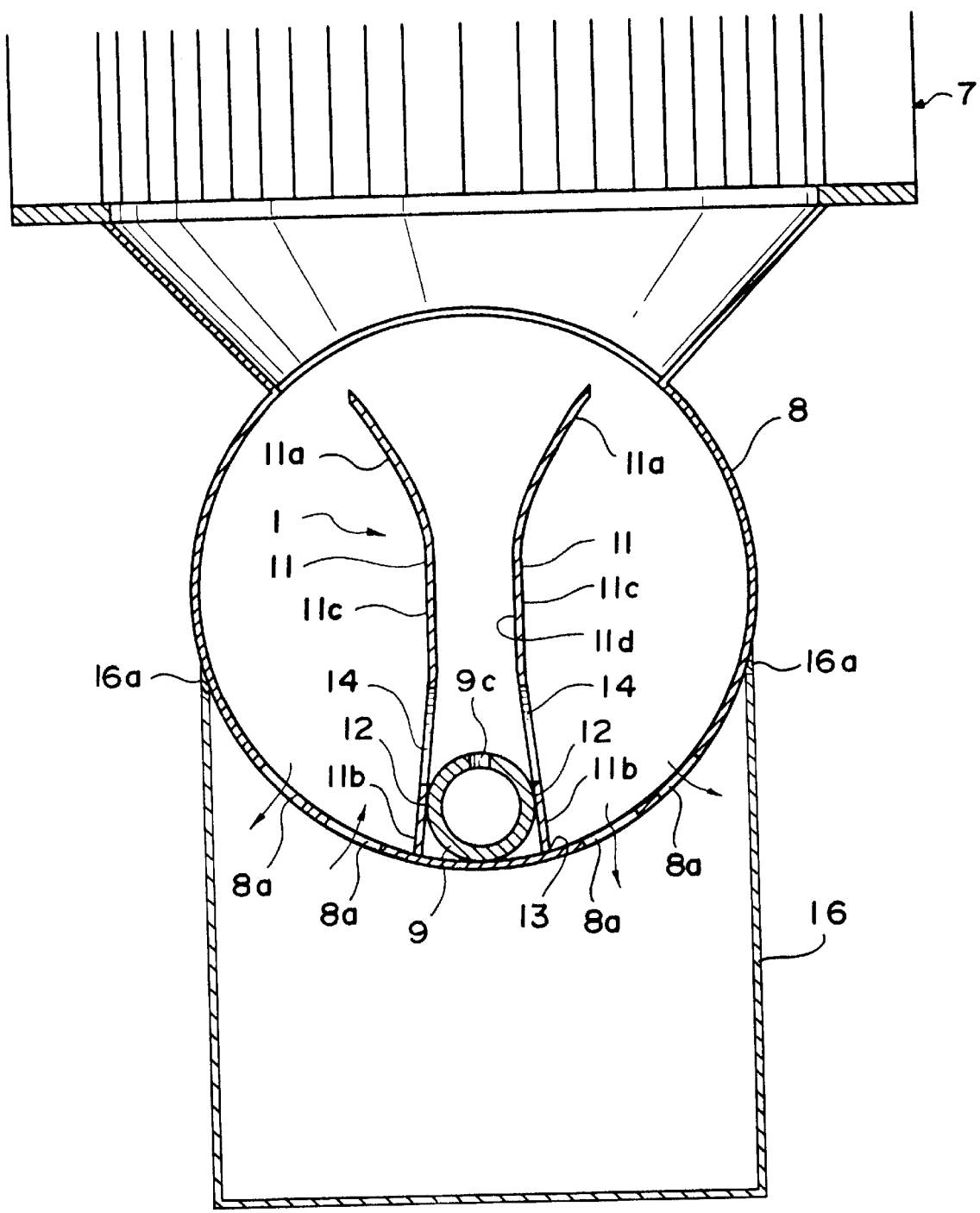
FIG. 5 is an enlarged view taken along line 5—5 of FIG. 2.

In order to increase the induced air mass to more effectively clean the filters 7, the venturi 1 of the present invention is provided, the details of which are illustrated in FIGS. 3, 4 and 5. The venturi 1 of the present invention comprises a pair of spaced, vertically extending rectangular plates 11, having divergent opposite end portions 11a, 11b integral with a parallel medial portion 11c, forming a throat portion 11d. The lower end portion of the venturi 1 is welded as at 12 to each side of the compressed air pipe 9 and to the interior surface of the clean air duct 8 as at 13. The throat portion 11d communicates with a plurality of compressed air outlet apertures 9c provided in the top wall portion of the compressed air pipe 9. An axially extending elongated opening 14 is provided in the lower portion of the face of each plate 11 in proximity to the compressed air outlet apertures 9c. While only one elongated opening 14 is illustrated, more than one opening can be employed in each plate, and the openings can be either elongated or circular.

By this construction and arrangement, induced air inlets are provided by the openings 14 on each side of the venturi 1 and at 15 at each open end thereof.

In the operation of the venturi 1, at the instant of the start of supersonic air flow up through the jets provided by the compressed air apertures 9c, large quantities of air are induced, not only through the openings 14 but also through the open ends 15 of the venturi 1. The rising jet flow increases the volume not only due to compression through the throat portion 11d and expansion through the upper end portion of the venturi 1, but also due to the air being induced, whereby the air mass is increased to thereby increase the impact effectiveness on cleaning the filter 7.

For larger collectors having large air flow rates, the capacity of the clean air duct 8 is increased, as will be seen in FIG. 5, by adding a rectangular duct 16 welded at 16a to the wall of the clean air duct 8 having openings 8a communicating the clean air duct 8 with the rectangular duct, thereby increasing the volume of the clean air duct 8 for handling large air flow rates, and thus minimum pressure loss in the system.

From the above description, it will be appreciated by those skilled in the art that the welded metal plate venturi 1 of the present invention is an improvement on conventional venturis employed in dust collector filter cleaning systems in that providing the elongated openings 14 in the faces of the plates 11 and the openings 15 at each end of the spaced plates 11, the air mass flowing through the venturi 1 is increased to thereby more effectively clean the filters 7. The venturi 1 is also economical, rugged and easily adapted to various dust collector designs and requirements.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A dust collector filter cleaning system comprising a housing, a plurality of filters mounted in said housing, a compressed air pipe mounted in said housing, a plurality of apertures provided in a wall of said compressed air pipe for pulse firing a jet of air into said filters, a plurality of venturis mounted in said housing between the compressed air pipe apertures and the filters, each venturi comprising a pair of spaced plates having faces extending tangentially to said compressed air pipe, an end portion of the face of each plate being fixedly connected to said compressed air pipe, the opposite end portions of the faces of the plates diverging outwardly relative to each other, said divergent opposite end portions being integral with a parallel medial portion, to thereby provide a throat portion communicating with said plurality of apertures in said compressed air pipe, at least one opening provided in the face of each plate in proximity to the air pipe apertures, the space between the faces of said plates providing an opening at each end of said venturi, whereby upon pulse firing a jet of compressed air through the compressed air pipe apertures, large quantities of air are induced through the open ends thereof, increasing the air mass and velocity, to thereby increase the impact effectiveness on cleaning the filters.

2. A dust collector filter cleaning system according to claim 1, wherein the pair of spaced plates are made of metal and are welded to the compressed air pipe.

3. A dust collector filter cleaning system according to claim 1, wherein the opening in the face of each plate is elongated.

4. A dust collector filter cleaning system according to claim 1, wherein a clean air duct is mounted in said housing, said compressed air pipe being positioned in said clean air duct, and a supplemental clean air duct secured to said clean air duct, openings in a wall of said clean air duct communicating with said supplemental clean air duct.

5. A dust collector filter cleaning system according to claim 4, wherein the clean air duct has a circular cross-sectional configuration and the supplemental clean air duct has a rectangular cross-sectional configuration.

6. A venturi mounted on a compressed air pipe having a plurality of apertures for delivering pulsed compressed air jets against a filter to remove particulates therefrom, comprising a pair of spaced plates having faces extending tangentially to said compressed air pipe, an end portion of the face of each plate being fixedly connected to said compressed air pipe, the opposite end portions of the faces of the plates diverging outwardly relative to each other, said divergent opposite end portions being integral with a parallel medial portion, to thereby provide a throat portion communicating with said plurality of apertures in said compressed air pipe, an opening provided in the face of each plate in proximity to the air pipe apertures, the space between the faces of said plates providing an opening at each end of the venturi, whereby upon pulse firing a jet of compressed air through the compressed air pipe apertures, large quantities of air are induced through the openings in the faces of the plates of the venturi and through the open ends thereof, increasing the air mass to thereby increase the impact effectiveness on cleaning the filter.

\* \* \* \* \*